Dec. 7, 1965 G. W. ROEHRS 3,221,527
HOLLOW BALL STUDS

Original Filed March 3, 1960 3 Sheets-Sheet 1

INVENTOR.
Guenter W. Roehrs
BY
W. F. Wagner
ATTORNEY

Dec. 7, 1965  G. W. ROEHRS  3,221,527
HOLLOW BALL STUDS

Original Filed March 3, 1960  3 Sheets-Sheet 2

INVENTOR.
Guenter W. Roehrs
BY
W. F. Wagner
ATTORNEY

Dec. 7, 1965   G. W. ROEHRS   3,221,527
HOLLOW BALL STUDS
Original Filed March 3, 1960   3 Sheets-Sheet 3
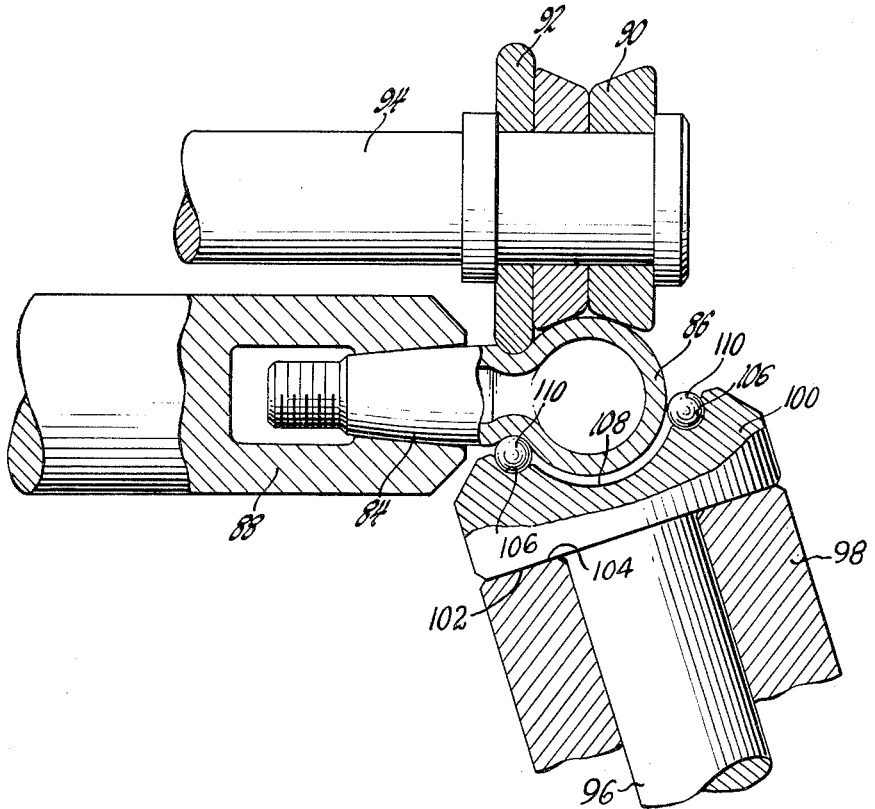
Fig. 16
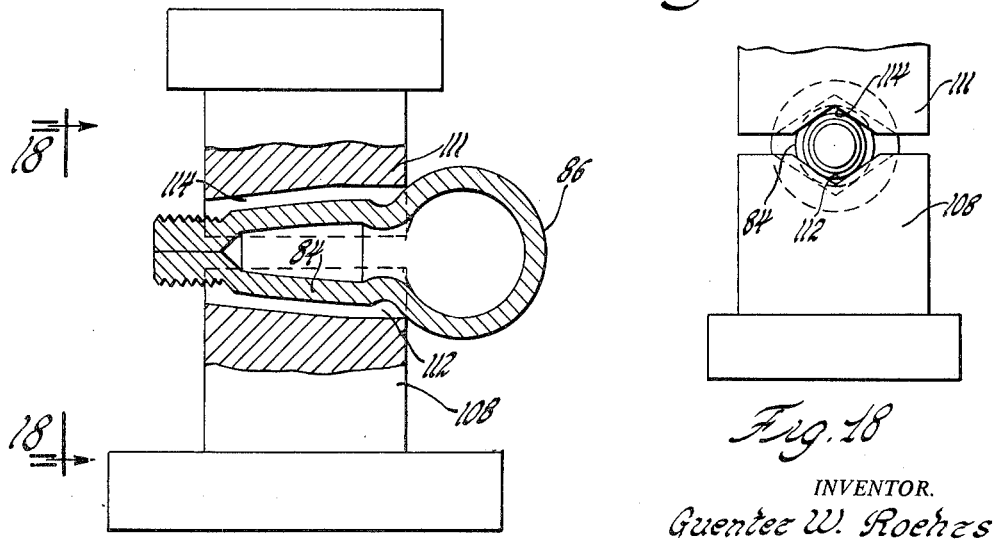
Fig. 17
Fig. 18
INVENTOR.
Guenter W. Roehrs
BY
W. F. Wagner
ATTORNEY United States Patent Office 3,221,527
Patented Dec. 7, 1965

3,221,527
HOLLOW BALL STUDS
Guenter W. Roehrs, Rochester, Mich., assignor to General Motors Corporation, Detroit, Mich., a corporation of Delaware
Original application Mar. 3, 1960, Ser. No. 12,604. Divided and this application Nov. 13, 1962, Ser. No. 236,929
2 Claims. (Cl. 72—80)

This application is a division of Serial No. 12,604, filed March 3, 1960, and entitled, Hollow Ball Studs, and now abandoned.

This invention relates to new and useful improvements in stud members having spherical shaped heads and more particularly to stud members having hollow ball-like heads.

For many years, ways and means have been sought to manufacture studs with spherical heads in a more economical manner while maintaining high standards of precision and strength. Studs with spherical heads, or more commonly ball studs, are presently used in a myriad of applications including aircraft, automotive and machine tool applications. Conventional methods of forming ball studs include such machine operations as turning, grinding, heat treating, honing, shot peening and many other similar costly and time-consuming processes. It has been found that hot forged or cold formed blanks reduce manufacturing costs and generally increase the quality of such parts; but in previous practice costly machine operations involving metal removal, and consequent tool wearing, have been required.

It is therefore an object of this invention to produce ball studs having the optimum strength and weight characteristics required in such industries as missile and aircraft manufacture.

Another object is to manufacture ball studs from hot forged or cold formed blanks with a minimum of material removing machine operations.

It is a further object of this invention to improve the overall quality of ball studs by utilizing manufacturing operations that are nondisruptive of optimum grain structure.

It is a further object of this invention to utilize cheaper lower grade carbon steels instead of the presently required high carbon steels or alloys without deleterious loss of strength or precision.

The foregoing objects are accomplished by utilizing hollow formed ball studs that are manufactured from a hollow blank by forming operations causing plastic flow of the blank material into the desired configurations. The hollow blank accommodates excess material during the plastic flow by providing expansion space where needed so that no material removing operations are necessary to form the ball stud. Since no material is removed during the forming operation the grain structure obtained in the hollow blank for maximum strength remains unbroken in the finished article.

With the above and other objects in view, as will become apparent from the following detailed description, this invention resides in the novel construction and arrangement of parts and the method of manufacturing the same substantially as hereinafter described in detail with reference to the accompanying drawing in which:

FIGURES 15, 16 and 17 are side elevational views, partly in cross section, of suitable forming apparatus for use with my invention;

FIGURE 18 is an end view of the apparatus shown in FIGURE 17.

Figure 1:
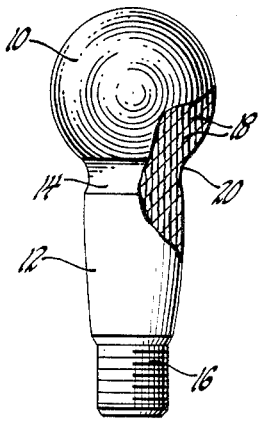
FIGURE 1 is a side elevational view, partly in section, of a conventional ball stud manufactured by conventional methods.

Referring now to FIGURE 1, a conventional ball stud is illustrated comprising a spherical or ball member 10 and a shank portion 12. A relief groove 14 circumferentially separates the ball portion 10 and the shank portion 12 about the periphery of the ball stud in the usual manner. In many applications, of course, the groove may be eliminated. Suitable connecting means such as a threaded portion 16 are generally provided on the end of the ball stud opposite the ball portion. As shown in cross section in FIGURE 1, the pattern of grain flow represented by the lines 18 are generally formed longitudinally of the ball stud for maximum strength. The preferred grain structure is achieved by cold forming or forging of a blank of material prior to the formation of the ball stud configuration shown. In previous practice it has been found to be extremely difficult and practically impossible to form this type of ball stud to precise dimensions without utilizing a machining process which involves material removal by converting excessive stock of the blank into chips. Such machining operations are a strength reducing influence causing undesirable stress concentrations such as illustrated at the point 20 where the pattern of grain flow has been broken by a machining operation forming the peripheral groove 14. In order to improve endurance strength, a subsequent shot peening process has been required in prior practice.

Figure 2:
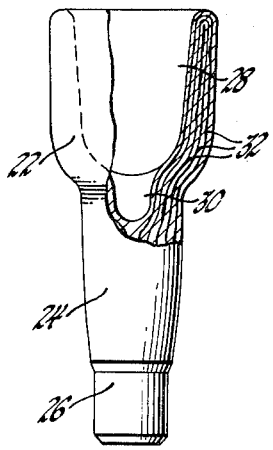
FIGURE 2 is a side elevational view of an embodiment of my invention before the finishing operation.
Figure 3:
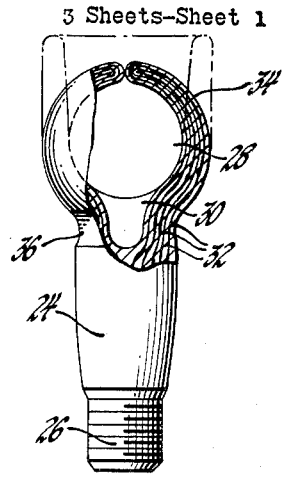
FIGURE 3 is a side elevational view, partly in cross section, of the finished blank of FIGURE 2.

My invention eliminates the aforementioned problems by providing, in the preferred embodiment, a tulip-shaped extruded blank comprising a cup portion 22 and a shank portion 24 having a reduced end portion 26 as shown in FIGURE 2. A space 28 in the cup portion 22 is provided with a reduced space 30 axially extending into the shank 24 to accommodate ball studs requiring a peripheral groove. Lines 32 represent the pattern of grain flow and illustrate that the grain flow is unbroken in the unfinished blank. The finished ball stud is shown in FIGURE 3 after the cup shaped portion 22 has been formed into a sphere or ball-like member 34 by spinning, a press operation or any other suitable process. A peripheral groove 36 has also been formed; and, as shown by the lines 32 representing the pattern of grain flow, the forming operations have developed the desired contour in the unfinished blank by plastic flow of the material of the blank inwardly into the spaces 28 and 30 while retaining an unbroken pattern of grain flow.

Figure 4:
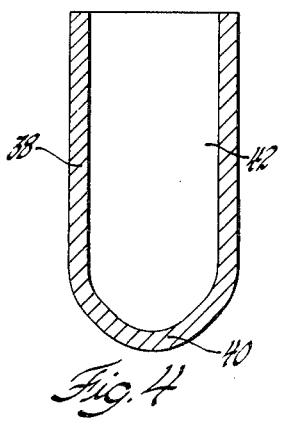
FIGURE 4 is a cross sectional view of the unfinished blank of an alternative embodiment of my invention.
Figure 5:
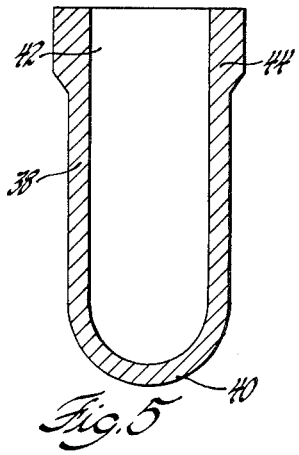
FIGURES 5, 6 and 7 are cross sectional views of the blank of FIGURE 4 after consecutive forming operation.
Figure 6:
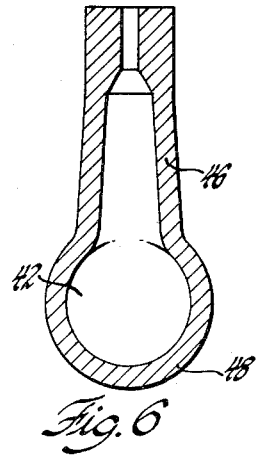
Figure 7:
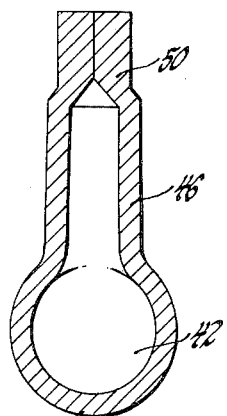
Figure 8:
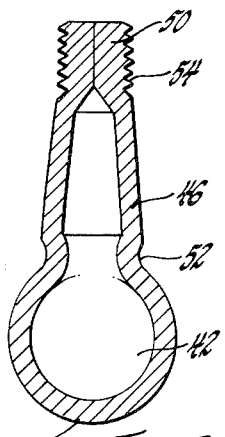
FIGURE 8 is a cross sectional view of the blank of FIGURE 4 after the final forming operations.
Figure 9:
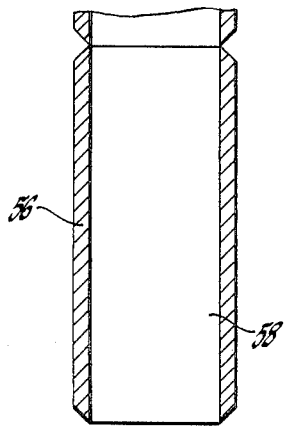
FIGURE 9 is a cross sectional view of a blank of another embodiment of my invention.

An alternative embodiment of the invention is shown in FIGURES 4 through 8. A cup shaped unfinished blank is shown in FIGURE 4 as a unitary member having a cylindrical wall 38 and a curved bottom wall 40 enclosing a space 42. The blank may be produced from bar stock by cold extrusion of a slug or from sheet metal by deep drawing in a conventional manner. The first step of the forming operation accomplished without metal removal relates to the gathering of additional material 44 as required by particular design considerations at the end of the blank providing the opening to the space 42. The second step of the forming operation results in the plastic flow of material of the blank into the form illustrated in FIGURE 6 without removal of any of the material of the original blank and having a reduced shank portion 46 and a spherical ball-like portion 48. As shown in FIGURE 7, the end 50 of the blank opposite the ball portion 48 is closed and reduced in diameter for a purpose to be hereinafter described. The finished ball stud is shown in FIGURE 8 after the peripheral groove 52 has been rolled or otherwise formed into the wall 38 to provide relief for stress concentration and to allow for greater motion of a mating spherical female member as is conventional. In addition, threads 54 have been formed on the reduced portion 50 on the end of the shank. The finished form of the ball stud is entirely a result of forming operations which cause plastic flow of the material into the space 42 without the removal of any material from the unfinished blank so that the mass of the unfinished blank and the mass of the finished ball stud are substantially equal. In some cases minor metal removing operations such as drilling a hole in the reduced end portion of the shank are performed after the basic hollow ball stud has been formed by "chipless" operations.

Figure 10:
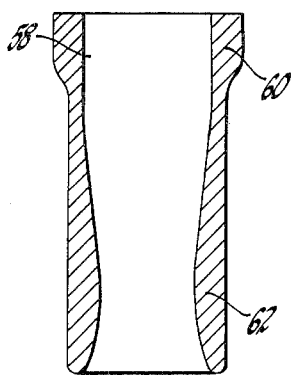
FIGURES 10, 11, 12 and 13 are cross sectional views of the blank of FIGURE 9 after consecutive forming operations.
Figure 11:
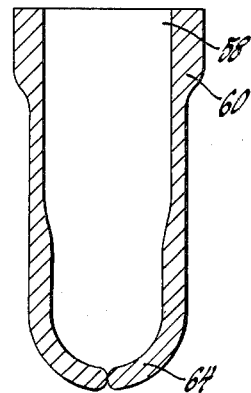
Figure 12:
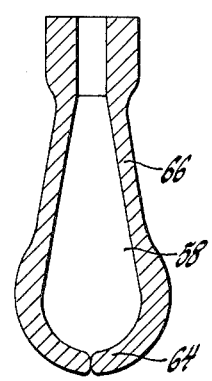
Figure 13:
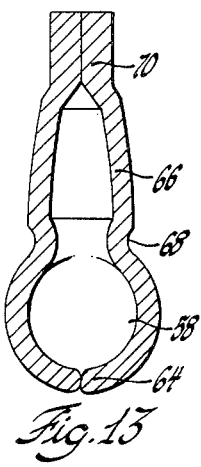
Figure 14:
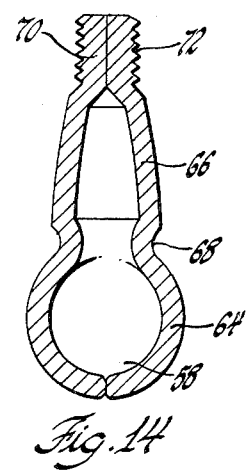
FIGURE 14 is a cross sectional view of the finished blank of FIGURE 9.

Another embodiment of my invention is illustrated in FIGURES 9 through 14 and comprises a ball stud blank of tube stock having a cylindrical wall 56 in a longitudinally extending passage 58. The result of the first step of the forming operation is illustrated in FIGURE 10 and shows the blank material gathered at 60 and 62 to enhance rigidity and plastic flow or formability in subsequent forming operations. In the next step of operation, one end of the blank is closed to form a sphere-like portion 64 shown in FIGURE 11 and then the shank portion 66 is formed by plastic inward flow to the form illustrated in FIGURE 12. A peripheral groove 68 is next formed as by rolling or any other suitable method into the shank portion 66, the sphere or ball portion 64 is further developed into final form, and the end portion 70 of the ball stud is reduced as shown in FIGURE 13. FIGURE 14 represents the ball stud in the finished form having rolled threads 72 on one end and a sphere or ball portion 64 on the other. As in the previous embodiment the finished ball stud has been formed solely by plastic flow of the original material obtained in the blank. If desired the hollows formed in the ball studs may be closed as by welding, brazing or soldering and the enclosed space may be used for lubrication or for a cooling medium if required. If a lubricant is to be contained therein a small orifice is provided to allow seepage of the lubricant to the periphery of the ball surface. Although hollow ball studs are cooler operating than conventional solid studs, any suitable cooling medium may be sealed within the hollow to further dissipate heat caused by extreme operating conditions.

The sphere as well as the shank of the new type hollow studs can be produced to machined dimensions by forming operations on conventional tools requiring no removal of material. The tolerances of such studs depend on the precision, the quality and the wear characteristics of the tools employed. The hollow ball studs may be manufactured by the use of closed type precision dies with minimum wear because excessive material on the unfinished blank is easily moved into the hollow of the stud during the ball stud forming operations.

In some instances requiring extremely high precision and high surface finish, form generating devices as hereinafter described may be used. Due to the hollow design, a "chipless" form generating and surface finishing process is applicable for extremely high precision and mirror-like surface finishes when required.

Figure 15:
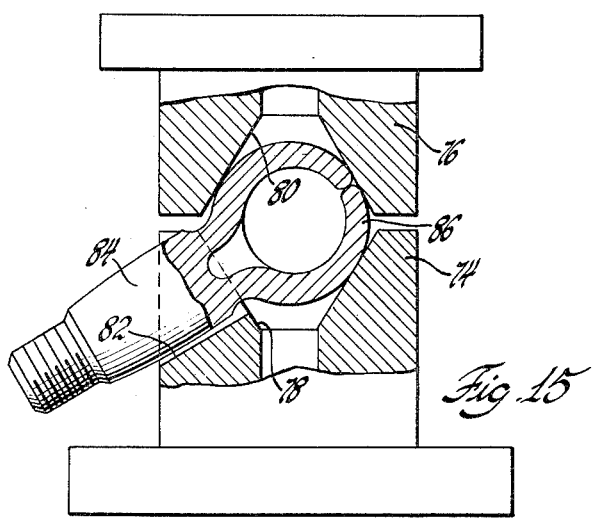

FIGURE 15 illustrates an arrangement for form generating a sphere or ball portion of the stud on a fast running short stroke press. A lower die member 74 and an upper die member 76 are provided with ground, cone-shaped cavities 78 and 80. A slot 82 is provided in the lower die 74 to accommodate a stud shank 84 and the ball portion 86 is accommodated within the cone cavity of the upper and lower dies. In operation this fixture is set in a press and it is seen that die members form an annular surface element when contacting the ball portion 86. During each stroke of the press the ball stud is rotated at a suitable feed rate around the axis of the shank so that the annular surface elements formed by the dies will generate a sphere or ball portion of high precision and surface quality.

In FIGURE 16 an alternative arrangement for generating a sphere or ball portion of the stud on a fast The stud shank 84 is fixedly secured within a rotatably mounted chuck 88. A properly shaped back-up roll comprising a sphere or ball forming portion 90 and a groove forming portion 92 is secured on a spindle 94 mounted for rotation on an axis parallel to the axis of chuck 88. The roll forming device includes a driven spindle 96 rotatably mounted in a support 98. Spindle 96 includes a head portion 100 having a thrust absorbing back surface or shoulder 102 abutting the face 104 of support 98. The front face of head portion 100 is formed with a number of spherical shaped bearing seats 106 arranged in a circular path around a central spherical depression 108. Polished hardened steel balls 110 are retained in seats 106 as both the ball portion 86 of the stud and the roll forming apparatus rotate about their respective axes under constant pressure to displace excessive material by plastic flow into the interior of ball portion 86.

FIGURE 17 relates to suitable dies 108 and 111 for form generating the shank 84 of the hollow ball stud. The die members are provided with longitudinal V-shaped working surfaces 112 and 114. Gradual rotation of the shank around its axis during each press stroke generates a precise shank of superior surface quality.

It has been found that hollow ball studs produced in conventional forming dies are entirely satisfactory for the great majority of applications. The strength of the material used for the ball studs is improved by the cold forming process because favorable grain structure is retained and the material distribution may be controlled without loss of the necessary dimensional tolerances. It should be noted, however, that for special applications the ball and shank dimensions as well as surface quality, hardness and endurance strength can be readily improved by any necessary additional forming, finishing processes as illustrated. The hollow interior of the studs allows form generating of the sphere and shank to highly precise dimensions with a fine finish by swagging or roll burnishing with simple tools on conventional machinery without metal removal by plastic flow of excess material into the hollow.

Various changes and modifications in the details of construction of the aforedescribed embodiments are comprehended without departing from the spirit and scope of this invention as defined by the appended claims.

What is claimed is:

1. Apparatus for producing high precision sphericity and surface finish on the preformed spherical end portion of a hollow ball stud comprising, a chuck rotatably supporting the stud, roller members rotatably supported in surface contact with said spherical end portion, one of said roller members being a ring member having a diameter greater than the other of said members, the outer surfaces of the other of said rollers being inclined toward one another, driven means for applying circular line contact deforming pressure to said end portion in a plane normal to an axis intersecting the geometric center of said end portion at an angle to the axis of said chuck.

2. The apparatus defined in claim 1 wherein the means for applying circular line contact deforming pressure comprises a rotatably supported spindle, a plurality of spherical surfaces formed in one end of said spindle in a circular path normal to the axis thereof, and roller means located in said recesses engageable with said end portion.

References Cited by the Examiner
UNITED STATES PATENTS 1,842,571   1/1932   Sebell _____ 113—52
1,902,779   3/1933   Hoffman _____ 113—52

CHARLES W. LANHAM, *Primary Examiner.*
NEDWIN BERGER, MICHAEL V. BRINDISI,
*Examiners.*

UNITED STATES PATENT OFFICE
CERTIFICATE OF CORRECTION

Patent No. 3,221,527  December 7, 1965

Guenter W. Roehrs

It is hereby certified that error appears in the above numbered patent requiring correction and that the said Letters Patent should read as corrected below.

Column 2, lines 4 and 5, for "operation" read -- operations --; column 4, lines 16 and 17, for "generating a sphere or ball portion of the stud on a fast" read -- generating the sphere or ball portion 86 of a stud is shown. --.

Signed and sealed this 20th day of September 1966.

(SEAL)
Attest:

ERNEST W. SWIDER  EDWARD J. BRENNER
Attesting Officer  Commissioner of Patents